No. 888,633. PATENTED MAY 26, 1908.
T. W. MORGAN.
SPINDLE BEARING.
APPLICATION FILED MAY 11, 1907.
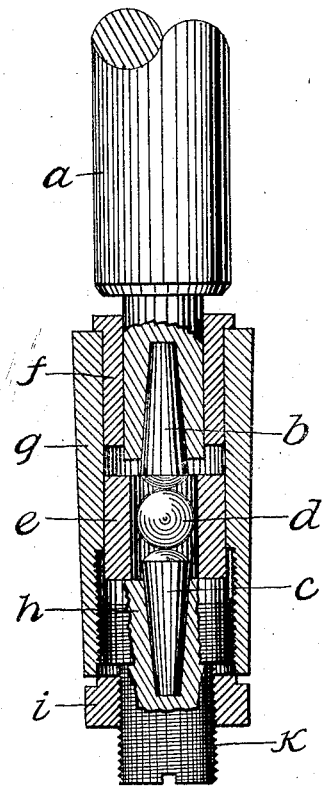
WITNESSES:
D. A. Kennedy
O. D. Young
INVENTOR
Thomas W. Morgan,
BY
G. C. Kennedy,
ATTORNEY

UNITED STATES PATENT OFFICE.

THOMAS W. MORGAN, OF WATERLOO, IOWA, ASSIGNOR TO WILBUR W. MARSH, OF WATERLOO, IOWA.

SPINDLE-BEARING.

No. 888,633.  Specification of Letters Patent.  Patented May 26, 1908.

Application filed May 11, 1907. Serial No. 373,184.

*To all whom it may concern:*

Be it known that I, THOMAS W. MORGAN, a citizen of the United States of America, and a resident of Waterloo, Blackhawk county, Iowa, have invented certain new and useful Improvements in Spindle-Bearings, of which the following is a specification.

My invention relates to improvements in spindle-bearings, and the object of my improvements is to furnish removable bearing-seats for anti-friction means interposed between the spindle end and such seats, such bearing-seats also being provided with suitable means for adjustment. This object I have accomplished by the means which are hereinafter described and claimed, and which are illustrated in the accompanying drawing, which is a central vertical axial section of my improved spindle-bearing, showing the anti-friction means *in situ* and the whole adjusted to working position.

The external surface of the bushing $g$ is of the form of a truncated cone, intended for insertion into some opening of similar registering shape in a supporting frame. Another bushing $f$ having a fillet on its outer portion at the top is inserted into the upper part of the bushing $g$, the fillet resting on the upper edge of said bushing $g$. The bushing $f$ serves as a bearing for the spindle-end $a$. The lower part of the inner periphery of the bushing $g$ is threaded so as to admit therein the adjustable bearing-seat $h$ which has a downward extension $k$ also threaded and a lock-nut $i$ thereon. Resting upon the upper end of the bearing-seat $h$ is a short cylindrical body $e$, whose inner vertical bore is slightly greater in diameter than the diameter of the anti-friction ball $d$ to be contained therein. The cylinder $e$ is movable vertically with the adjustable bearing-seat $h$ upon which it rests.

I have provided removable bearing pins $b$ and $c$, each having convex bearing-faces opposed to each other, for the reception of the ball $d$ therebetween. The pin $b$ is formed as a truncated cone to fit into a like formed seat in the lower end of the spindle-end $a$. The pin $c$ is of like form with $b$, and also seated in a like seat in the top of the adjustable bearing-seat $h$.

The bearing is assembled by first screwing therein the bearing-seat $h$ to the required height, with the bearing-pin $c$ therein, then introducing the cylinder $e$, then the ball $d$, then the bushing $f$, and finally the spindle-end $a$ with its bearing-pin $b$. The bore of the cylinder $e$ being but very little greater diameter than the diameter of the ball $d$, the latter is restrained there by from moving aside from the points of bearing which coincide with the axial line of the spindle-end $a$ and the pins $b$ and $c$. The surface to be affected by friction is thereby lessened to the minimum, and the ball is kept in its proper bearing position. As the bearing-pins $b$ and $c$ are removable, it is easy to remove them and substitute others when their bearing-surfaces become too much abraded.

Having described my invention, what I claim as new, and desire to secure by Letters Patent of the United States, is—

A spindle-bearing, composed of a bushing-sleeve, an adjustable bearing-seat therein, a removable bearing-pin in said seat, a spindle rotatable in said bushing-sleeve, a removable bearing-pin in said spindle-end, a ball interposed in bearing contact between said bearing-pins, and a hollow bearing on said bearing-seat adapted to inclose said ball and prevent sidewise movement thereof.

Signed at Waterloo, Iowa, this 23rd day of April 1907.

THOMAS W. MORGAN.

Witnesses:
O. D. YOUNG,
G. C. KENNEDY.